United States Patent [19]

Reister et al.

[11] Patent Number: 5,402,344
[45] Date of Patent: Mar. 28, 1995

[54] METHOD FOR CONTROLLING A VEHICLE WITH TWO OR MORE INDEPENDENTLY STEERED WHEELS

[75] Inventors: David B. Reister, Oak Ridge; Michael A. Unseren, Knoxville, both of Tenn.

[73] Assignee: Martin Marietta Energy Systems, Inc., Oak Ridge, Tenn.

[21] Appl. No.: 110,693

[22] Filed: Aug. 23, 1993

[51] Int. Cl.$^6$ .......................... B60K 28/16; B60T 8/58
[52] U.S. Cl. ...................... 364/424.05; 364/426.02; 180/197
[58] Field of Search ...................... 364/424.05, 426.02, 364/426.04; 180/197, 170; 303/93, 97; 280/772, 91, 707

[56] References Cited

U.S. PATENT DOCUMENTS

| | | | |
|---|---|---|---|
| 4,541,051 | 9/1985 | Jarret et al. | 364/424 |
| 4,674,048 | 6/1987 | Okumura | 364/424 |
| 4,866,624 | 9/1989 | Nishikawa et al. | 364/426.03 |
| 5,014,802 | 5/1991 | Knoll et al. | 180/140 |
| 5,019,984 | 5/1991 | Masaki et al. | 364/426.02 |
| 5,024,285 | 6/1991 | Fujita | 180/197 |
| 5,085,288 | 2/1992 | Shiraishi et al. | 180/197 |
| 5,090,510 | 2/1992 | Watanabe et al. | 180/197 |
| 5,141,071 | 8/1992 | Edahiro et al. | 180/197 |
| 5,157,611 | 10/1992 | Ikeda et al. | 364/426.02 |
| 5,164,903 | 11/1992 | Lin et al. | 364/426.03 |
| 5,208,751 | 5/1993 | Berkefeld | 364/424.05 |
| 5,212,641 | 5/1993 | Iwata et al. | 364/424.05 |
| 5,243,526 | 9/1990 | Ito et al. | 364/426.02 |
| 5,267,783 | 12/1993 | Inoue et al. | 303/111 |
| 5,292,188 | 3/1994 | Okazaki | 303/111 |

OTHER PUBLICATIONS

Unseren, M. A., "Rigid body dynamics and decoupled control architecture for two strongly interacting manipulators", *Robotica*, vol. 9, pp. 421–430 (1991).

Faessler, H., "Manipulators Constrained by Stiff Contact; Dynamics, Control, and Experiments", *Int'l. J. of Robotics Reserach*, vol. 9, pp. 40–58 (1990).

Kankaanranta, R. K., and H. N. Koivo, "Dynamics and Simulation of Compliant Motion of a Manipulator",

*IEEE Journal of Robotics and Automation*, vol. 4, No. 2, pp. 163–173 (1988).

(List continued on next page.)

*Primary Examiner*—Kevin J. Teska
*Assistant Examiner*—Tan Q. Nguyen
*Attorney, Agent, or Firm*—Martin J. Skinner; James M. Spicer; Harold W. Adams

[57] ABSTRACT

A method (10) for independently controlling each steerable drive wheel ($W_i$) of a vehicle with two or more such wheels ($W_i$). An instantaneous center of rotation target (ICR) and a tangential velocity target ($v^G$) are inputs to a wheel target system (30) which sends the velocity target ($v_i^G$) and a steering angle target ($\theta_i^G$) for each drive wheel ($W_i$) to a pseudovelocity target system (32). The pseudovelocity target system (32) determines a pseudovelocity target ($v_P^G$) which is compared to a current pseudovelocity ($v_P^m$) to determine a pseudovelocity error ($\epsilon$). The steering angle targets ($\theta^G$) and the steering angles ($\theta^m$) are inputs to a steering angle control system (34) which outputs to the steering angle encoders (36), which measure the steering angles ($\theta^m$). The pseudovelocity error ($\epsilon$), the rate of change of the pseudovelocity error ( ), and the wheel slip between each pair of drive wheels ($W_i$) are used to calculate intermediate control variables which, along with the steering angle targets ($\theta^G$) are used to calculate the torque to be applied at each wheel ($W_i$). The current distance traveled for each wheel ($W_i$) is then calculated. The current wheel velocities ($v^m$) and steering angle targets ($\theta^G$) are used to calculate the cumulative and instantaneous wheel slip (e, ) and the current pseudovelocity ($v_P^m$).

8 Claims, 3 Drawing Sheets

OTHER PUBLICATIONS

Reister, D. B., "A New Wheel Control System for the Omindirectional Hermies–III Robot", *Oak Ridge National Laboratory*, Apr., 1991.

Reister, D. B., and M. A. Unseren, "Position and Force Control of a Vehicle with Two or More Steerable Drive Wheels", *Oak Ridge National Laboratory*, submitted May 2–7, 1993.

Matsumoto, N., and M. Tomizuka, "Vehicle lateral velocity and yaw rate control with two independent control inputs", *U. of Cal., Berkeley*, pp. 1868–1875.

Amano, Y., et al., "Model Following Control of Hybrid 4WD Vehicles", *Toyota Central Res. and Develop. Labs, Inc.*, pp. 437–442 (1990).

Borenstein, J., "Compliant–Linkage Kinematic Design for Multi–Degree–of–Freedom Mobile Robots", *University of Michigan, Nov. 15–20, 1992.*

Reister, D. B., et al., "Experimental Investigations of Sensor–Based Surfacce Following Tasks by a Mobile Manipulator", *Oak Ridge National Laboratory*, submitted Oct. 27–29, 1993.

Koivo, A. J., *Fundamentals for Control of Robotic Manipulators*, John Wiley & Sons, Inc., pp. 415–420 (1991).

METHOD FOR CONTROLLING A VEHICLE WITH TWO OR MORE INDEPENDENTLY STEERED WHEELS

This invention was made with Government support under Contract No. DE-AC05-84OR21400 awarded by the U.S. Department of Energy to Martin Marietta Energy Systems, Inc. and the Government has certain rights in this invention.

TECHNICAL FIELD

This invention relates to the field of wheeled vehicles having two or more steerable drive wheels. More specifically, this invention relates to the independent control of each of the steerable drive wheels in a vehicle having two or more independently steerable drive wheels.

BACKGROUND ART

It is well known that in some cars and mobile platforms, each wheel is driven independently. When such vehicles are steered, the translational velocity of each wheel is typically dependent upon the velocities of each of the remaining wheels. Due to the interdependency of each of the velocities of the individual wheels, as the operator of the vehicle continues to control the drive wheels, it is well known that errors occur and the wheels slip, an error occurring when a wheel is driven at a lower or higher velocity than required.

It is well known that when a vehicle is driven in an arcuate path, the motion of each wheel is constrained. The wheel velocity divided by the radius to the center of rotation must be the same for all wheels. Further, each wheel must be instantaneously traveling in a path tangential to a circle concentric with circles about which each of the other respective wheels are traveling.

It is well known that a vehicle with two drive wheels has one constraint and one degree of freedom. A vehicle with four drive wheels has three constraints and one degree of freedom. For a vehicle with n drive wheels, it follows that there are (n-1) constraints and one degree of freedom. The degree of freedom present in each of the above cases may be parameterized by a new scalar variable termed the pseudovelocity, while the (n-1) constraints are imposed on the values of the wheel translational velocities.

Several articles have been published which discuss a control architecture for constrained mechanical systems. Typical of these articles are M. A. Unseren, "Rigid Body Dynamics and Decoupled Control Architecture for Two Strongly Interacting Manipulators," *Robotica*, pp. 421–430 (1991), Vol. 9; H. Faessler, "Manipulators Constrained by Stiff Contact: Dynamics, Control, and Experiments," *The International Journal of Robotics Research*, pp. 40–58 (1990), Vol. 9, No. 4; and R. K. Kankaanranta and H. N. Koivo, "Dynamics and Simulation of Compliant Motion of a Manipulator," IEEE Journal of Robotics and Automation, Vol. 4, No. 2, pp. 163–173 (1988).

Of these, Kankaanranta and Koivo disclose the most material art to the present invention. Kankaanranta and Koivo disclose the application of a control architecture to constrained manipulators. Kankaanranta and Koivo do not disclose the application of such a control architecture for controlling vehicles and other mobile platforms.

It is well known that a wheel is a system that must satisfy a nonholonomic constraint. At each instant, a wheel rolling on a horizontal plane without slipping can move in one only direction. Motion in the orthogonal direction requires maneuvering. An example of the maneuvering required by a nonholonomic platform is the parallel parking of a car, where it is desirable to move the automobile in a direction orthogonal to the wheels. In this example, it is well known that the optimum path is arc-line-arc and is accomplished by turning the wheels to one limit, backing, straightening the wheels, backing, turning the wheels to the other limit, backing, and straightening the wheels.

A mobile platform with steerable wheels can use the steering degrees of freedom to reduce the required maneuvering. For example, a car with four steerable wheels can parallel park by turning the four wheels sideways and moving directly into the parking space. In addition to moving in a line in any direction, a platform with steerable wheels can move in a circle about any center of rotation, which is useful for working around circular objects such as storage drums or tanks.

Several devices have been developed which include independently-controlled wheels. Typical of the art are those devices disclosed in the following U.S. Pat. Nos:

| U.S. Pat. No. | Inventor(s) | Issue Date |
| --- | --- | --- |
| 4,541,051 | J. Jarret, et al. | Sep. 10, 1985 |
| 4,674,048 | K. Okumura | June 16, 1987 |
| 4,866,624 | S. Nishikawa, et al. | Sep. 12, 1989 |
| 5,019,984 | S. Masaki, et al. | May 28, 1991 |
| 5,024,285 | N. Fujita | June 18, 1991 |
| 5,085,288 | S. Shiraishi, et al. | Feb. 4, 1992 |
| 5,090,510 | K. Watanabe, et al. | Feb. 25, 1992 |
| 5,157,611 | T. Ikeda, et al. | Oct. 20, 1992 |
| 5,164,903 | W. C. Lin, et al. | Nov. 17, 1992 |

Of these patents, the Jarret ('051) patent is directed toward a vehicle having two steerable drive wheels. The Jarret device includes one or more pairs of non-steerable drive wheels, each driven independently. In such vehicles, when more than one pair of non-steerable drive wheels is provided, motion of the vehicle is limited to straight line translational movement. Therefore, no rotational motion may be accomplished.

The Okumura ('048) device as disclosed includes two non-steerable drive wheels, the translational velocities of each being independent of the other. Due to the lack of constraint on each of the translational wheel velocities, the translational velocity of each wheel pair may vary from each other pair of wheels.

The Nishikawa ('624) patent discloses a four-wheel drive vehicle having a front differential, a rear differential, and a differential between the front and rear pairs of wheels. The differentials provided by Nishikawa serve to remove the constraints from each of the wheels. In such vehicles, all of the wheels are driven by a single motor. A differential system such as incorporated in the Nishikawa vehicle is not desirable in a vehicle wherein each of the wheels is independently actuated.

The Masaki ('984) patent does not disclose a means for sensing or controlling steering angles of the independent drive wheels. Masaki is directed toward slip detection and correction techniques based solely on the sensing and measurement of the wheel rotation rates in order to improve the braking efficiency of a vehicle, considering each wheel as an individual entity.

Fujita ('285) discloses a device which includes two steerable wheels and two non-steerable drive wheels. Fujita requires detecting and correcting the slip of the wheel or wheels and necessitates the sensing of the rotational velocity of the un-driven wheels. However, it is not desirable to require any knowledge of un-driven wheels, as they are preferably included for stability of the vehicle and provide no directional or motivational forces to the vehicle.

The Shiraishi ('288) patent discloses a device which has four wheels, the front pair being driven. Shiraishi provides a means for detecting slippage of a wheel due to discontinuities in the surface over which the vehicle is traveling.

Watanabe ('510), as did Nishikawa ('624) above, discloses a vehicle having four-wheel drive capability which includes a front differential, a rear differential, and a differential between the front and rear wheel pairs. As in other devices cited, the Watanabe device includes a pair of steerable drive wheels and a pair of non-steerable drive wheels. The Watanabe device is capable of translational motion only, and is not capable of rotational motion.

Ikeda ('611) discloses a four-wheeled device capable of either front-wheel drive or rear-wheel drive, but not both. Ikeda controls the torque of each drive wheel to maintain it at a pre-specified reference value. The Ikeda device is not treated as a single constrained mechanical system.

Although in one embodiment of the Lin ('903) patent is disclosed a vehicle which may have four independent drive wheels, Lin assumes that the wheels are pointed forward and the drive speed for each is identical to the drive speed of the others. The Lin disclosure is not directed toward a vehicle having n number of steerable drive wheels, each being constrained and each having a unique target speed. Nor does Lin account for the inter-wheel coupling effects which are quantified by constraints imposed on the translational velocities of each of the wheel pairs in a four-wheel drive system.

Therefore it is an object of the present invention to provide a means to minimize errors and prevent slipping of the individual wheels of a wheeled vehicle having two or more independently-steerable drive wheels, especially when controlling the vehicle to follow a path about a selected center of rotation.

It is another object of the present invention to provide such a means whereby the positioning accuracy of the vehicle is enhanced.

Another object of the present invention is provide such a means which may be adaptable to any type of vehicle wherein a plurality of drive wheels is incorporated, including automobiles and robots.

Still another object of the present invention is to provide a means whereby the translational velocities of all of the wheels in such a vehicle may be controlled as a single unit.

DISCLOSURE OF THE INVENTION

Other objects and advantages will be accomplished by the present invention which serves to control a vehicle with two or more independently steered wheels. The method for controlling a vehicle with two or more independently-steered wheels, or method, is designed for independently controlling the direction and velocity of each drive wheel in order to maintain a selected path and velocity of the mobile platform and may be incorporated in any mobile platform such as an automobile or a remotely controlled robotic platform to enhance movement thereof in any selected direction.

The method of the present invention is designed to control a mobile platform having n number of independent steerable drive wheels. However, when a vehicle with two or more steerable drive wheels is traveling in an arcuate path, the motion of the wheels is constrained. The wheel translational velocity divided by the radius to the center of rotation must be the same for all wheels. When the drive wheels are controlled independently, errors occur and the wheels will slip. Therefore, the method of the present invention serves to control all of the constrained wheels as a unit rather than independently.

It is also a goal of the present method to maintain a selected tangential velocity when traveling about the selected point. The velocity of the mobile platform must be constantly monitored and adjusted in order to achieve this goal.

The ICR target and the tangential velocity target are input to a motion and traction control system where they are processed. Appropriate output signals are then delivered to each independently-steerable drive wheel in order to control the direction of travel and the translational velocity thereof. The ICR target and the tangential velocity target are inputs to a wheel target system. The wheel target system sends the velocity target and the steering angle target for each drive wheel to a pseudovelocity target system which determines a pseudovelocity target which is compared to a current pseudovelocity to determine a pseudovelocity error.

The steering angle target for each wheel is also input to a steering angle control system for each steerable drive wheel. Also input to the steering angle control system is the current steering angle for each wheel. The steering angle control system outputs to a steering angle encoder for each wheel which controls the current steering angle for each wheel. Thus, a cycle is created whereby the current and target steering angles are compared and the current steering angles are continually adjusted to conform to the target steering angles.

The pseudovelocity error derived as described above is used in conjunction with the current wheel slip between each pair of drive wheels in order to calculate intermediate control variables. The intermediate control variables, along with the steering angle targets are used to calculate a torque to be applied at each wheel.

The torque to be applied to each wheel is input to a drive motor control system for each wheel. The encoders for each wheel measure the current cumulative distance traveled for each wheel.

The current cumulative distance traveled for each wheel is input to a wheel velocity calculation system for each drive wheel which calculates a current wheel velocity for each drive wheel. The current wheel velocity and steering angle target for each drive wheel are inputs to a current value of pseudovelocity and wheel slip calculation system which calculates the current wheel slip between each pair of drive wheels and the current value of the pseudovelocity.

Thus, it can be seen that a continuous loop is established for computing the torque which is applied to each drive wheel in order to closely track the desired velocity and path of the mobile platform.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
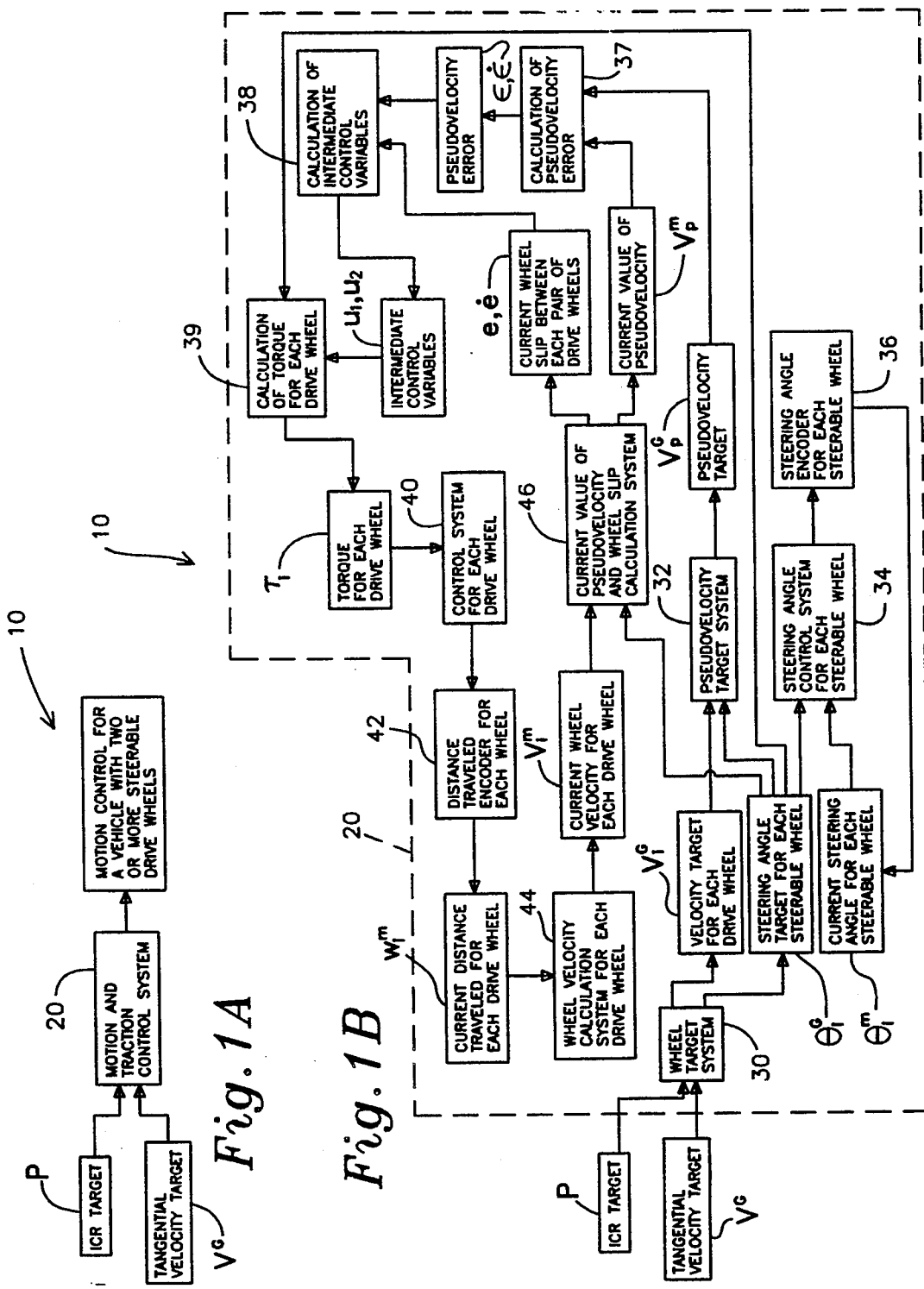
FIG. 1A is a schematic diagram of the method for controlling a vehicle with two or more independently steered wheels of the present invention.
FIG. 1B is a detailed schematic diagram of the method for controlling a vehicle with two or more independently steered wheels of the present invention illustrated in FIG. 1A.

A method for controlling a vehicle with two or more independently steered wheels incorporating various features of the present invention is illustrated generally at 10 in FIGS. 1A and 1B. The method for controlling a vehicle with two or more independently steered wheels, or method 10, is designed for independently controlling the direction and velocity of each drive wheel $W_i$ in order to maintain a selected path and velocity of the mobile platform 14. The method 10 may be incorporated in any mobile platform 14 such as an automobile or a remotely controlled robotic platform to enhance movement thereof in any selected direction.

FIGS. 1A and 1B illustrate graphically the method 10 of the present invention, which is designed to control a mobile platform 14 having n number of independent steerable drive wheels $W_i$ about a selected point P.

It is also a goal of the present method 10 to maintain a selected tangential velocity when traveling about point P. The velocity of each wheel $W_i$ of the mobile platform 14 must be constantly monitored and adjusted in order to achieve this goal.

As shown in FIG. 1A, the ICR target and the tangential velocity target $V^G$ of a point on the mobile platform 14 are inputs to a motion and traction control system 20 where they are processed. Appropriate output signals are then delivered to each independently-steerable drive wheel $W_i$ in order to control the direction of travel and the translational velocity thereof.

More specifically, as shown in FIG. 1B, the ICR target and the tangential velocity target $V^G$ are inputs to a wheel target system 30. The wheel target system 30 sends the velocity target $v_i^G$ and the steering angle target $\theta_i^G$ for each drive wheel $W_i$ to a pseudovelocity target system 32. The pseudovelocity target system 32 determines a pseudovelocity target $v_P^G$ which is compared to a current pseudovelocity $v_P^m$ to determine the pseudovelocity error $\epsilon$, .

The steering angle target $\theta_i^G$ for each wheel $W_i$ is also an input to a steering angle control system 34 for each steerable drive wheel $W_i$. Also an input to the steering angle control system 34 is the current steering angle $\theta_i^m$ for each wheel $W_i$. The steering angle control system 34 outputs to a steering angle encoder 36 which measures the current steering angle $\theta_i^m$ for each wheel $W_i$. Thus, a cycle is created whereby the current and target steering angles $\theta_i^m$, $\theta_i^G$ are compared and the current steering angles $\theta_i^m$ are continually adjusted to conform to the target steering angles $\theta_i^G$. The pseudovelocity error $\epsilon$, derived as described above is used in conjunction with the current wheel slip e, between each pair of drive wheels $W_i$ in order to calculate intermediate control variables $u_1, u_2$ as shown at 38. The intermediate control variables $u_1, u_2$, along with the steering angle targets $\theta^G$ are used to calculate the torque $\tau_i$ to be applied at each wheel $W_i$.

The torque $\tau_i$ to be applied to each wheel $W_i$ is input to a control system for each drive wheel $W_i$ as indicated at 40. The wheel control systems 40 output to distance-traveled encoders 42 for each wheel $W_i$, which in turn determine the current distance traveled for each wheel $W_i$.

The current distance traveled for each wheel $W_i$ is input to a wheel translational velocity calculation system 44 for each drive wheel $W_i$ which calculates the current wheel velocity $v_i^m$ for each drive wheel $W_i$. The current wheel velocity $v_i^m$ and steering angle target $\theta_i^G$ for each drive wheel $W_i$ are inputs to a current value of pseudovelocity and wheel slip calculation system 46 which calculates the current wheel slip e, between each pair of drive wheels $W_i$ and the current value of the pseudovelocity $v_P^m$.

Thus, it can be seen that a continuous loop is established for computing the torque $\tau_i$ applied to each drive wheel $W_i$ in order to closely track the desired velocity and path of the mobile platform 14.

As stated above in the description of FIG. 1B, the ICR target and the tangential velocity target $V^G$ are inputs to a motion and traction control system 20 where they are processed. As the input data is processed in the wheel target system 30, the velocity target $v_i^G$ and the steering angle target $\theta_i^G$ for each drive wheel $W_i$ are calculated and sent to the pseudovelocity target system 32 which then determines a pseudovelocity target $v_P^G$ as given by:

$$v_P^G = \sum_{i=1}^{n} b_i(\theta^G) v_i^G,$$

where $b_i$ are elements of a vector B, the elements of which will be defined below.

The pseudovelocity target $v_P^G$ is compared to a current pseudovelocity $v_P^m$ as shown at 37 to determine the pseudovelocity error $\epsilon$, which is given by:

$$\epsilon = \int_0^t \dot{\epsilon}\, dt,$$

where the rate of change of the pseudovelocity error is given by:

$$\dot{\epsilon} = v_P^G - v_P^m.$$

The pseudovelocity error $\epsilon$, derived as described above is used in conjunction with the current wheel slip e, between each pair of drive wheels $W_i$ in order to calculate intermediate control variables $u_1, u_2$ as shown at 38, and as given by:

$$u_1 = K_1\dot{\epsilon} + K_2 e, \text{ and}$$

$$u_2 = k_3 + k_4 \epsilon,$$

where $u_1$, $e$, and are vectors having (n-1) elements, $K_1$ and $K_2$ are (n-1) x (n-1) diagonal matrices, and $u_2$, $\epsilon$, , $k_3$, and $k_4$ are scalars.

The intermediate control variables $u_1$, $u_2$, along with the steering angle targets $\theta^G$ are used at 39 to calculate the torque $\tau_i$ to be applied at each wheel $W_i$, each of which, as indicated above, is input to a control system for each drive wheel $W_i$ as illustrated at 40. The torque $\tau$ is given by:

$$\tau = A^T u_1 + F u_2 + \quad v_P^m,$$

where A is an (n-1) x n matrix and F is an n vector. The rigid body kinematic constraints imposed on the wheel velocities are expressed mathematically by:

$$\sum_{j=1}^{n} a_{ij}(\theta^G) v_j^m = 0; \, i = 1, 2, \ldots, n-1,$$

or in a compact matrix column vector form:

$$A(\theta^G) v^m = 0.$$

The vector B must be selected such that the composite (n x n) matrix S, whose first (n-1) rows are matrix A and whose last row is B:

$$S = \begin{bmatrix} a_{11} & a_{12} & \cdots & a_{1n} \\ a_{21} & a_{22} & \cdots & a_{2n} \\ \cdots & \cdots & \cdots & \cdots \\ a_{(n-1)1} & a_{(n-1)2} & \cdots & a_{(n-1)n} \\ b_1 & b_2 & \cdots & b_n \end{bmatrix},$$

is non-singular.

Expanding along the last row of S, the determinant of S is given by:

$$|S| = \sum_{i=1}^{n} b_i \Delta_{ni},$$

where the $\Delta_{ni}$ are the cofactors of S.

The inverse of S is partitioned into the two matrices E,F as given by:

$$S^{-1} = [E \; F],$$

where E is an n x (n-1) matrix.

An example of a definition for B is:

$$b_i = \frac{\Delta_{ni}}{\rho},$$

where $\rho$ is a scalar given by:

$$\rho = \sum_{i=1}^{n} (\Delta_{ni})^2.$$

The vector F introduced in the computed torque $\tau$ control law is calculated by:

$$F = \frac{1}{|S|} \begin{bmatrix} \Delta_{n1} \\ \Delta_{n2} \\ \cdot \\ \cdot \\ \cdot \\ \Delta_{nn} \end{bmatrix}.$$

The current wheel velocity $v_i^m$ and steering angle target $\theta_i^G$ for each drive wheel $W_i$ are inputs to a current value of pseudovelocity and wheel slip calculation system 46 which calculates the current wheel slip e, between each pair of drive wheels $W_i$ and the current value of the pseudovelocity $v_P^m$. The current value of the pseudovelocity $v_P^m$ may be determined as given by:

$$v_P^m = \sum_{i=1}^{n} b_i(\theta^G) v_i^m.$$

The instantaneous wheel slip $_i$ is given by:

$$e_i = \sum_{j=1}^{n} a_{ij}(\theta^G) v_j^m; \, i = 1, 2, \ldots, n-1.$$

The cumulative wheel slip $e_i$ may be determined by:

$$e_i = \int_0^t e_i \, dt.$$

The cumulative and instantaneous wheel slips e, are then sent to calculate the intermediate control variables $u_1, u_2$ as depicted at 38 and previously described. Thus, it can be seen that a continuous loop is established for computing the torque $\tau_i$ applied to each drive wheel $W_i$ in order to closely track the desired velocity and path of the mobile platform 14.

Figure 2:
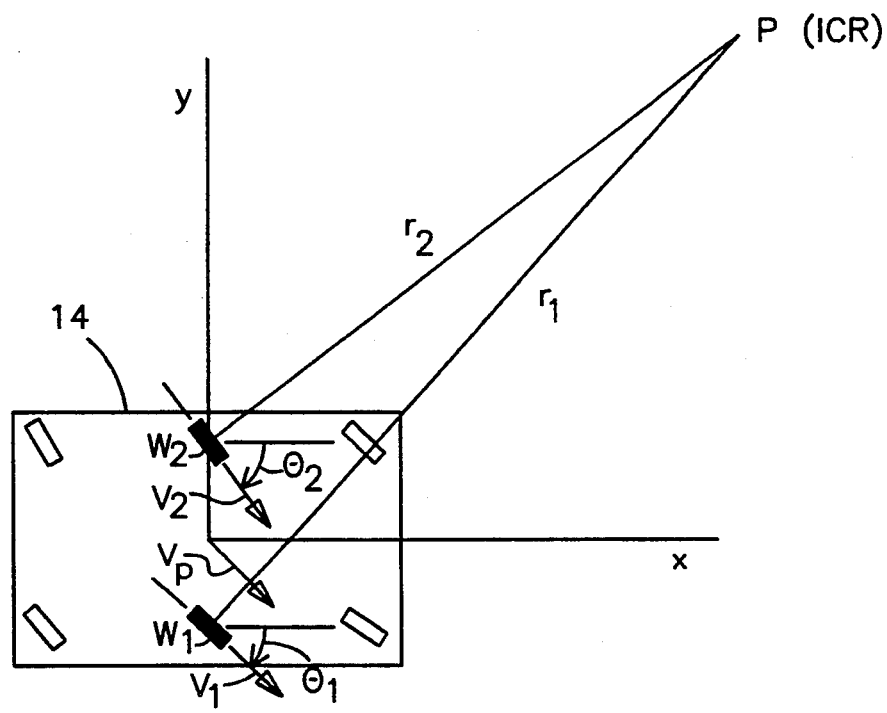
FIG. 2 illustrates a diagram of a mobile platform including two steerable drive wheels being controlled to move about a point P using the method of the present invention.
Figure 3:
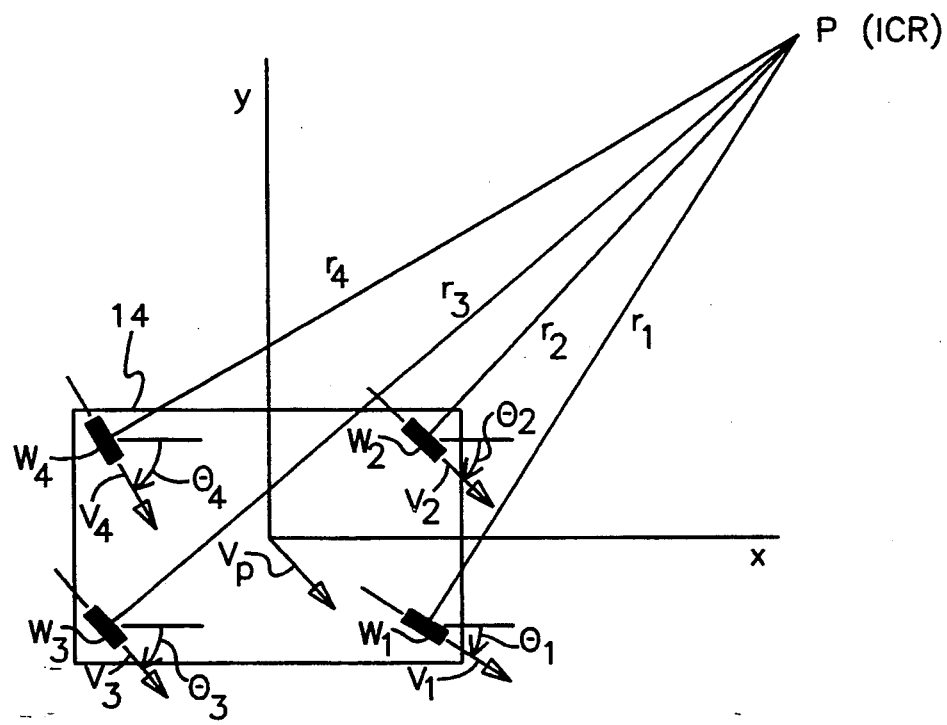
FIG. 3 illustrates a diagram of a mobile platform including four steerable drive wheels being controlled to move about a point P using the method of the present invention.

Shown in FIG. 2 is a mobile platform 14 incorporating two independently steerable drive wheels $W_1, W_2$. FIG. 3 illustrates a mobile platform 14 incorporating four independently steerable drive wheels $W_1, W_2, W_3, W_4$. In each of these embodiments, the platform 14 is shown rotating about an instantaneous point P. For ease of discussion, the four wheel platform 14 of FIG. 3 will be the primary focus of preliminary discussion.

Each of the wheels $W_i$ is positioned a distance $r_i$ from the point P. The distances $r_i$ are the radii of the circles about which the wheels $W_i$ are traveling at the illustrated instant in time. Each of the wheels $W_i$ is oriented such that it is tangent to the circle defined by the respective radii $r_i$ with respect to the point P.

Shown are x- and y-axes with respect to the mobile platform 14. Each of the four wheels $W_i$ defines a steering angle $\theta_i$, respectively, between the direction of the wheel $W_i$ and the x-axis. Positive values of the angle $\theta_i$ are measured counterclockwise from the local x-axis at the wheel $W_i$.

The velocity of each wheel $W_i$ must be proportional to each other wheel $W_j$ in order to prevent slipping. The proportionality is determined by the quotient of the velocity of a particular wheel $W_i$ divided by the radius $r_i$ of the particular wheel $W_i$ from the instantaneous point P. If the quotient for one wheel $W_i$ is not equivalent to the quotient for each other wheel $W_j$—i.e., at least one of the wheels $W_i$ is moving at a velocity lesser or greater than required—then at least one of the wheels $W_i$ will slip. The method 10 of the present invention is designed to correct any such errors to prevent wheel slippage in a mobile platform 14 having any plurality of steerable drive wheels $W_i$.

In like fashion to the embodiment shown in FIG. 3, mobile platforms 14 incorporating fewer or more than four drive wheels $W_i$ operate in substantially the same manner. The mobile platform 14 incorporating two independently steerable drive wheels $W_1, W_2$ as shown in FIG. 2 has one constraint and one degree of freedom. A mobile platform 14 with four drive wheels $W_1, W_2, W_3, W_4$, such as that shown in FIG. 3, has three constraints and one degree of freedom. It follows that for a mobile platform 14 with n drive wheels $W_i$, there is one degree of freedom and n-1 constraints. The one degree of freedom may be parameterized by a new scalar variable termed the pseudovelocity $v_P$.

Due to the rigidity of a mobile platform 14, the distance between the centers of the two wheels $W_1, W_2$ is fixed for the embodiment illustrated in FIG. 2. When either or both of the wheels $W_1, W_2$ are not pointing forward ($\theta_1 = \theta_2 = 0$), the velocities of the two wheels $W_1, W_2$ must satisfy a Rigid Body Constraint, which is calculated by:

$$V_1^m \sin(\theta_1^G) = V_2^m \sin(\theta_2^G),$$

where the target values of the steering angles have been used. The physical significance of the above relationship is that the components of each wheel velocity $v_i$ along the line connecting the respective wheel centers must be equal.

If the two wheels $W_1, W_2$ point in different directions, the two lines that are the axes of rotation for the wheels $W_1, W_2$ intersect at an instantaneous center of rotation ICR. When moving about a target point P, it is the goal to maintain the instantaneous point P as the ICR.

Whenever the wheels $W_1, W_2$ are in the forward position, there are no constraints on the translational velocities $v_1, v_2$. As soon as one or both of the wheels $W_1, W_2$ is/are steered from the forward position, the constraint becomes active and discontinuous changes in velocity $v_1, v_2$ may be required to satisfy the constraint.

The method 10 of the present invention provides independent velocity control of the translation of the drive wheels $W_i$. The input velocity targets $v^G$ satisfy the constraint. However, the measured wheels velocities $v^m$ may not satisfy the Rigid Body Constraints.

For the purpose of demonstrating the benefits of the method 10 of the present invention for controlling a mobile platform 14 with two or more steerable drive wheels $W_i$, experimental results from two experiments are discussed below. The first of the two experiments was a rotation of 120 degrees about experiments was a rotation of 120 degrees about the point (2 meters, 2 meters) relative to the mobile platform 14. The second experiment was a translation of ten feet at a 30 degree angle. The experimentation of the present invention was performed using a mobile platform 14 such as that described by one of the co-inventors, D. B. Reister, in "A New Wheel Control System for the Omnidirectional Hermies-III Robot", *Robotica*, pp. 351-360 (1992), Vol. 10.

The input data set for a forward rotation of 120 degrees about the point (2 meters, 2 meters) in vehicle coordinates is displayed in Table 1 below. Each row of Table 1 contains five values: time, targets for the wheel velocities $v_1^G, v_2^G$, and targets for the steering angles $\theta_1^G, \theta_2^G$. The units of the wheel velocities $v_1^G, v_2^G$ are meters/second and the units of the steering angles $\theta_1^G, \theta_2^G$ are radians.

TABLE 1

| | Input Data for a Forward Rotation of 120 Degrees about (2 meters, 2 meters) | | | |
|---|---|---|---|---|
| Time (seconds) | $v_1^G$ (meters/sec) | $v_2^G$ (meters/sec) | $\theta_1^G$ (radians) | $\theta_2^G$ (radians) |
| 2.50 | 0.0 | 0.0 | −0.6985 | −0.8905 |
| 14.47 | 0.45 | 0.3723 | −0.6985 | −0.8905 |
| 5.15 | 0.0 | 0.0 | −0.6985 | −0.8905 |

The distance between the two wheels of the mobile platform 14 used in the disclosed experiment is 0.7632 meters. The velocity target $v_i^G$ for the first wheel $W_i$ in this experiment is 0.45 meters per second. The velocity target $v_2^G$ for the second wheel $W_2$ is determined by dividing 0.45 by the velocity ratio, which is 1.2088.

During the first segment of the experiment, the wheels $W_1, W_2$ are steered. At the steering velocities for the platform, the steering motion should take less than one second. However, the length of the first segment is 2.5 seconds. The extra time allows the steering motion to be completed before the wheels $W_1, W_2$ begin to rotate.

During the second segment of the experiment, the wheels $W_1, W_2$ accelerate to maximum velocity. During the rotational motion, the first wheel $W_1$ will travel 6.51 meters. The time required to reach maximum speed is 2.15 seconds. During that time, the first wheel $W_1$ will travel 0.48 meters. During the experiment, $W_1$ will ramp up to maximum speed in 0.48 meters, travel at maximum speed for 5.55 meters, and ramp down to rest in 0.48 meters. The first wheel $W_1$ requires 12.32 seconds to travel 5.55 meters. Thus, the velocity target $v_1^G$ for the first wheel $W_1$ will be 0.45 meters/second for 14.47 seconds (the sum of 2.15 and 12.32) and will be 0.0 for 2.15 seconds.

The input data set for the second experiment, a forward translation of ten feet at a 30 degree angle (30 degrees=0.5236 radians), is displayed in Table 2.

TABLE 2

| | Input Data for a Forward Translation of 10 Feet at 30 Degrees | | | |
|---|---|---|---|---|
| Time (seconds) | $v_1^G$ (meters/sec) | $v_2^G$ (meters/sec) | $\theta_1^G$ (radians) | $\theta_2^G$ (radians) |
| 3.00 | 0.0 | 0.0 | 0.5236 | 0.5236 |
| 6.77 | 0.45 | 0.45 | 0.5236 | 0.5236 |
| 5.14 | 0.0 | 0.0 | 0.5236 | 0.5236 |

The steering angles $\theta_1^G, \theta_2^G$ for the two wheels $W_1, W_2$ are constant and equal. The ramp up time and distance are the same as in the first experiment. Each wheel $W_1, W_2$ will travel 3.05 meters (10 feet). Each wheel $W_1, W_2$ will ramp up to maximum speed in 0.48 meters, travel at full speed for 2.08 meters, and ramp down to rest in 0.48 meters. Each wheel $W_1, W_2$ requires 4.62 seconds to travel 2.08 meters. Thus, the velocity target $v_1^G, v_2^G$ for the wheels $W_1, W_2$ should be 0.45 meters/second for 6.77 seconds (the sum of 2.15 and 4.62). The initial and final segments are similar to those of the first experiment.

The empirical results of four iterations of the first and second experiments are in Table 3.

TABLE 3

Summary of Results for the First and Second Experiments.

| Exp. # | Case | Direction | Force | Ratio ($w_1^m/w_2^m$) | Error (%) |
|---|---|---|---|---|---|
| 1 | A | Forward | No | 1.1424 | −5.49 |
| 1 | B | Backward | No | 1.1409 | −5.61 |
| 1 | C | Forward | Yes | 1.2064 | −0.20 |
| 1 | D | Backward | Yes | 1.2068 | −0.17 |
| 2 | E | Backward | No | 1.0822 | 8.22 |
| 2 | F | Forward | No | 1.0898 | 8.98 |
| 2 | G | Backward | Yes | 1.0009 | 0.09 |
| 2 | H | Forward | Yes | 1.0015 | 0.15 |

Figure 4:
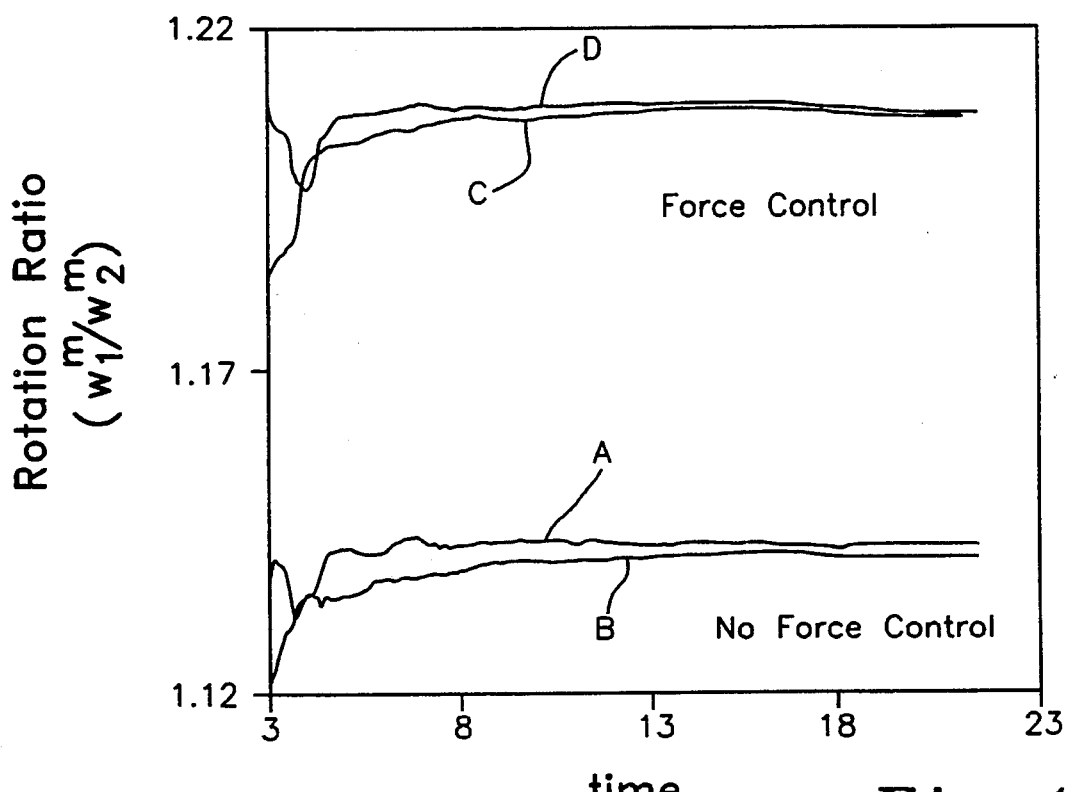
FIG. 4 is a graphical display of experimental results of the rotation of a mobile platform one hundred twenty degrees (120°) about point (2 meters, 2 meters) using the method of the present invention.

The four cases for the first experiment are labeled Case A to Case D. The direction of the rotation alternates between forward and backward. For Cases A and B, the force control was turned off by setting the gain parameter matrices $K_1$ and $K_2$ to zero. For Cases C and D, the force control was active. The ratio $w_1^m/w_2^m$ of the total movement of the first wheel to the total movement of the second wheel should be equal to the ratio of the velocities ($v_1^G/v_2^G=1.2088$). Without force control, the errors are about 5.5%. With force control, the error is reduced by more than a factor of 20 to about 0.2%. FIG. 4 graphically illustrates the results of the first experiment.

Figure 5:
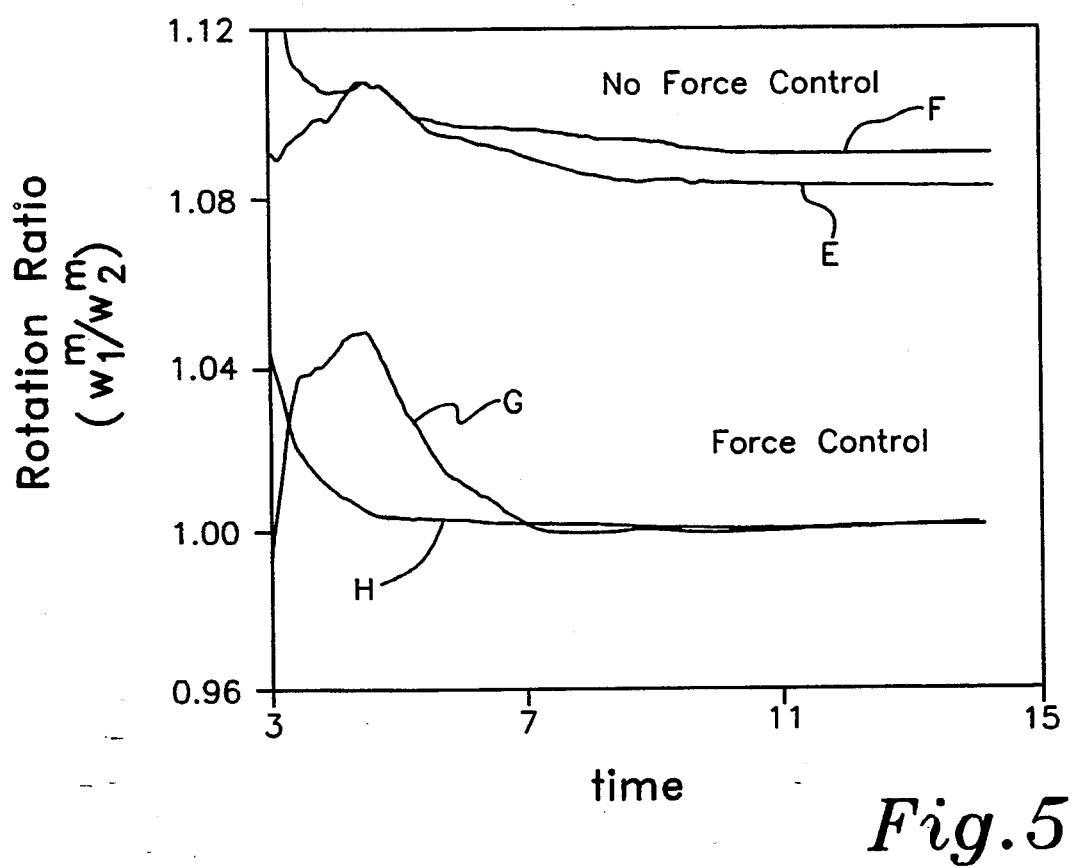
FIG. 5 is a graphical display of experimental results of the translation of a platform ten (10) feet at thirty degrees (30°) using the method of the present invention.

The four cases for the second experiment are labeled Case E to Case H. The force control was off for Cases E and F and on for Cases G and H. For this experiment, the velocity ratio should be 1.0. Without force control, the errors are more than 8%. With force control, the error is reduced by more than a factor of 40 to less than 0.2%. FIG. 5 graphically illustrates the results of the second experiment.

In the above example, the method 10 of the present invention has been described in detail for application with a mobile platform 14 having two steerable drive wheels $W_1, W_2$. However, as disclosed previously, the method 10 may be applied to mobile platforms 14 having more than two steerable drive wheels $W_i$. Of course, appropriate modifications must be made to the method 10 for each arrangement with which it is to be employed.

For example, referring back to FIG. 3, a mobile platform 14 having four independently steerable drive wheels $W_1, W_2, W_3, W_4$ rotating about point P may be driven by the method be of the present invention. In that example, if one of the wheel velocities $v_1^G, v_2^G, v_3^G, v_4^G$ is an exogenous input and the target steering angles $\theta_1^G, \theta_2^G, \theta_3^G, \theta_4^G$ are known, the other three of the velocities $v_1^G, v_2^G, v_3^G, v_4^G$ are determined by three rigid body constraints.

From the foregoing description, it will be recognized by those skilled in the art that a method for controlling a vehicle with two or more independently steered wheels has been disclosed. The method of the present invention is designed to provide a means to minimize errors and prevent slipping of the individual wheels of a wheeled vehicle having two or more independently-steerable drive wheels, especially when controlling the vehicle in a path about a selected center of rotation.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A method for controlling each of a plurality of independently steerable drive wheels of a vehicle using a motion and traction controller for imparting rotation and for steering each of the plurality of independently steerable drive wheels of the vehicle, said vehicle being maneuvered about a selected center of rotation at a selected velocity, said method comprising the steps of:
 (a) determining a translational velocity target for each of said plurality of wheels using said motion and traction controller;
 (b) determining a steering angle target for each of said plurality of wheels using said motion and traction controller;
 (c) steering each of said plurality of independently steerable drive wheels at said steering angle target;
 (d) determining a pseudovelocity target for said vehicle using said velocity target for each of said plurality of independently steerable drive wheels;
 (e) measuring a cumulative distance traveled by each of said plurality of independently steerable drive wheels using said motion and traction controller;
 (f) determining a measured velocity of each of said plurality of independently steerable drive wheels using said measured cumulative distance traveled by each of said plurality of independently steerable drive wheels;
 (g) determining a wheel slip between at least one pair of said plurality of independently steerable drive wheels using said measured velocities of each of said at least one pair of said plurality of independently steerable drive wheels;
 (h) determining a measured pseudovelocity of said vehicle using said measured velocities of each of said plurality of independently steerable drive wheels;
 (i) determining an error between said measured pseudovelocity and said pseudovelocity target;
 (j) determining a torque to be applied to each of said plurality of independently steerable drive wheels using said wheel slip, said error between said measured pseudovelocity and said pseudovelocity target, and said steering angle target for each of said plurality of independently steerable drive wheels; and
 (k) setting a torque target for each of said plurality of independently steerable drive wheels.

2. The method of claim 1 wherein each of said plurality of independently steerable drive wheels includes a driving torque controller for performing said step of setting a torque target for each of said plurality of independently steerable drive wheels.

3. The method of claim 1 wherein each of said plurality of independently steerable drive wheels includes a steering angle controller for performing said step of steering each of said plurality of independently steerable drive wheels at said steering angle target.

4. The method of claim 1 wherein each of said plurality of independently steerable drive wheels includes a cumulative distance monitor for performing said step of measuring a cumulative distance traveled by each of said plurality of independently steerable drive wheels.

5. The method of claim 1 wherein said motion and traction controller is used to determine a center of rotation target of said vehicle.

6. The method of claim 1 wherein said motion and traction controlled is used to determine a tangential velocity target of said vehicle.

7. The method of claim 1 wherein said motion and traction controller is used to perform the steps of determining a pseudovelocity target for said vehicle, determining a measured velocity of each of said plurality of independently steerable drive wheels, determining a wheel slip between at least one pair of said plurality of independently steerable drive wheels, determining a measured pseudovelocity of said vehicle, determining an error between said measured pseudovelocity and said pseudovelocity target, and determining a torque to be applied to each of said plurality of independently steerable drive wheels.

8. The method of claim 1 wherein said motion and traction controller comprises a wheel target controller, a pseudovelocity controller, and a steering angle controller, said wheel target controller for outputting said velocity target and said steering angle target for each of said plurality of independently steerable drive wheels, said pseudovelocity target controller for outputting said pseudovelocity target for each of said plurality of independently steerable drive wheels and for determining said pseudovelocity error, and said steering angle controller for determining a current steering angle and a steering angle error based upon said steering angle target output by said wheel target controller and said current steering angle.

* * * * *